Aug. 17, 1937.                 M. E. DAYTON                    2,090,113
                               TRAILER HITCH
                            Filed Sept. 22, 1934
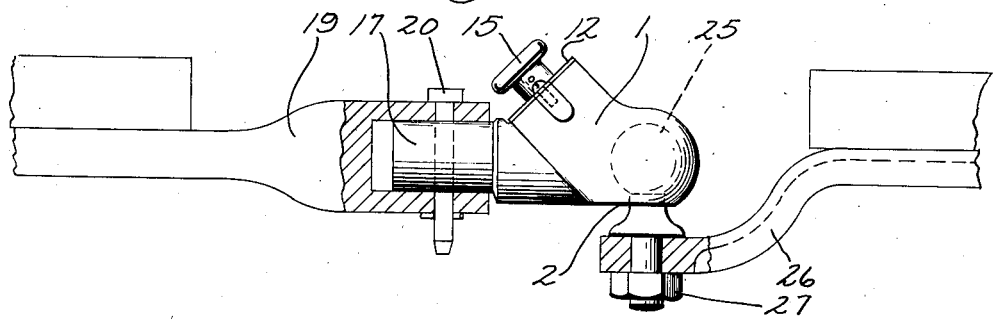
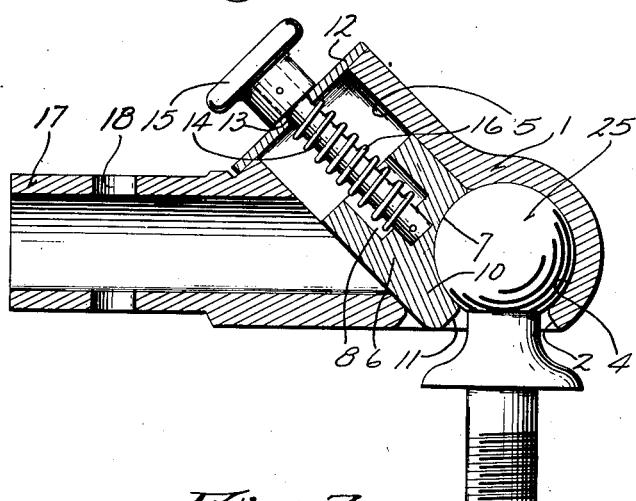
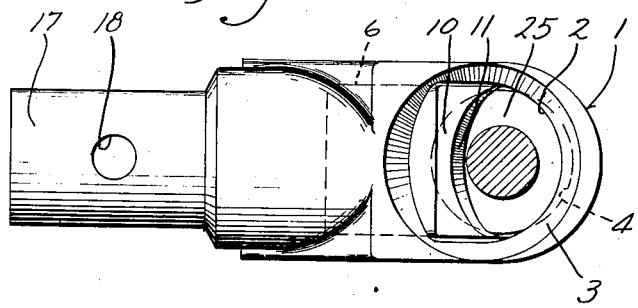
INVENTOR
Max E. Dayton
BY
Wheeler, Wheeler and Wheeler
ATTORNEYS

UNITED STATES PATENT OFFICE 2,090,113

TRAILER HITCH

Max E. Dayton, Rockford, Ill., assignor to Bamax Machine Co., Inc., Rockford, Ill., a corporation of Illinois Application September 22, 1934, Serial No. 745,087

8 Claims. (Cl. 280—33.15)

This invention relates to trailer hitches.

It is the principal object of this invention to provide a new and improved form of a trailer hitch of the ball and socket type in which the pressure of the ball will displace a locking plunger to permit the engagement of the coupling parts thereby reducing the danger of accident to the operator's hands while providing an efficient, simple and economical hitch. The device may also be engaged or released manually by the manipulation of a handle so located as to be conveniently close to the parts engaged but so disposed that the operator's hands are at all times protected.

It is a still further object to provide a coupling member between an automobile or like towing vehicle and a trailer, which member shall have a minimum number of wearing parts and in which the coupling parts are positively locked against release except by an actual manipulation of the operator.

In the drawing:

Fig. 1 is a view of my trailer hitch in side elevation.

Fig. 2 is a view of the device as it appears in section.

Fig. 3 is a plan view of the under side of my device.

Like parts are identified by the same reference characters in each of the several views.

The entire apparatus when properly assembled comprises two members in a ball and socket relation. One member is suitably connected to a towing vehicle such as a tractor, truck or the like while the other member has a trailer connection.

A suitable casting 1 is provided with a circular opening 2 bevelled at 3 giving access to a spherical socket 4 disposed therein. An angularly inclined bore 5 communicates with the socket 4 and slidably receives a ball-locking plunger 6 which has its lower end 10 bevelled at 11 and which is recessed at 8 to receive a spring 16 that normally supports the plunger in a position to partially obstruct the opening 2. Although the plunger yields freely in the direction of the ball insertion, the angle of its bore is such that it cannot be moved by the ball if the latter is moved outwardly. The angle of the bore 5 in relation to the plane of the opening (Fig. 2) is approximately 45 degrees. This relation can be varied somewhat, but should be such that when the plunger 6 is engaged over the socketed ball, the ball cannot move toward the socket opening without laterally engaging the plunger in a direction in which it is not free to move, the ball being thereby locked in place subject to manual withdrawal of the plunger.

Plunger 6 has a head portion 7 concavely formed in continuance of the spherical contour of the socket 4. Bore 5 is closed at its upper end by a removable plate 12 suitably held by screws. An aperture 13 on the plate 12 permits a rod 14 to enter the bore 5. Rod 14 is secured in the recess 8 of the plunger 6. A knob 15 on the rod 14 provides an external handle for moving the plunger 6.

The casting 1 further provides a cylindrical portion 17 apertured at 18 which fits telescopically into a member 19 on the trailer and is held therein by a suitable pin 20.

The ball member 25 is of a suitable size to permit free entry to the socket 4. Member 25 is secured to a towing vehicle draw bar arm 26 by means of a threaded fitting 27 mounted on the ball 25.

The hitch is illustrated in its coupled relation in each of the views attached hereto. To uncouple, the operator pulls the knob 15 to draw the plunger 6 into the bore 5, thus freeing the opening 2. The ball 25 can now be withdrawn from the socket 4 to release the trailer from the towing vehicle. Upon the release of the knob 15 by the operator, the plunger 6 returns to its normal position at opening 2 through the expansive action of the spring 16.

When it is desired to re-couple the hitch parts, the operator places the socket member over the ball 25. The bevel 3 guides the ball into engagement with the apex 11 of the plunger 6. Pressure of the ball member forces the plunger into the bore 5 against the tension of spring 16. This downward movement of the ball into the socket having been completed, the spring 16 is now free to expand and return the plunger to its position obstructing the opening 2. It now has the ball 25 locked against release in any manner other than by the manual manipulation of the operator just described. Any attempt to withdraw the ball from the socket simply wedges the plunger 6 more tightly against the casting 1.

The angular relation of the bore 5 to the opening 2 is of importance to the proper operation of my device. It is this feature that gives the positive locking desired of a coupling of this type. The operator does not have to closely approach the coupling to make the connection. Nevertheless in any manipulation of handle 15 he is protected against injury.

I claim:

1. A trailer hitch of the class described having in combination a ball, a socket member having a socket and a ball receiving opening, and yieldable means angularly disposed at approximately a forty-five degree angle in said socket member relative to the direction of admission of said ball and comprising a wall movable to restrict said opening substantially outside of said socket, and means pressing said yieldable means toward an opening-restricting position.

2. A trailer hitch comprising in combination a ball member having a neck portion, a socket device having a bevelled opening of greater diameter than said ball member and an internal cavity conforming to the shape of said ball, and means in said socket device comprising a portion of the wall of said cavity mounted for partial advance across said opening upon insertion or removal of said ball and retractible to permit entry of said ball member to said socket member or to effect the release of said ball from said socket, said means being so positioned relative to said opening as to restrict said opening outside of the position of the ball therein to effectively lock said ball member in said socket member while yielding under pressure of the ball during the insertion thereof, spring means urging said means to a position partially obstructing said opening, and a handle connected with said means for the retraction thereof.

3. A trailer hitch of the class described comprising in combination a socket member having a bevelled opening, a bore angularly disposed relative to said opening, a plunger of suitable cross section for said bore and positioned so that its outer end partially closes the bevelled opening, a bevel on the upper end of said plunger thereby to permit the plunger to move in said bore when pressure is applied on said bevel, and means returning said plunger to its aforesaid position at said opening, said socket member and plunger being so formed as to provide a socket for the reception of a ball substantially wholly inside said opening when said opening is partially closed by said plunger.

4. A hitch of the class described comprising in combination, a casting having a spherical socket and a bevelled opening, a bore in said casting, a plunger reciprocable in said bore and having a spherical face and a bevelled edge positioned to partially obstruct said opening, and spring means carried by said bore and said plunger for yieldably retaining said plunger in said position at said opening, the direction of the bore being such that the bevelled edge of the plunger in said position underlies said socket to a degree such that the outward thrust of a ball retained in said socket by said plunger will force said plunger more toward the side of the bore than axially thereof.

5. A hitch of the class described comprising in combination, a casting having a spherical socket and a bevelled opening, a bore in said casting obliquely disposed relative to said opening, a plunger reciprocable in said bore and having a spherical face and a bevelled edge positioned to partially obstruct said opening substantially outside of said socket, spring means carried by said bore and said plunger for yieldably retaining said plunger in said position at said opening, together with means comprising an apertured plate removably closing said bore at its outer end, and a knobbed rod movable in said aperture and secured in the lower end of said plunger.

6. A trailer hitch comprising in combination a ball member provided with a restricted neck portion and a head therebehind, a socket member having a relatively fixed socket wall formed to engage one side of said ball member adjacent the neck portion thereof and behind which the head of said ball member is receivable, and a retainer having a wall portion complementary to the wall portion of said socket member and engageable outside of the head of the ball member adjacent the neck portion thereof, said retainer being mounted on said socket member and biased for movement with respect thereto on an angular path toward a position for the retention of the head of said socket member, and means guiding said retainer for movement solely on said path, the angle of said path being such that said retainer yieldably permits movement of the head of said ball member to a position within said walls, and the thrust of said head in a direction of withdrawal is divided between said fixed wall and the complementary wall of said retainer, being exerted on the latter in a direction other than the direction of movement of said retainer upon said path.

7. A trailer hitch comprising the combination with a ball member having a ball head and a reduced neck, of a socket member having relatively fixed and movable wall portions together comprising a socket for the reception of said head, the movable wall portion of said socket member being concavely formed to constrict said socket about said neck, and means mounting the movable wall portion of said socket member to the fixed wall portion thereof for relative movement to and from a position wherein the concave part of said movable wall portion engages said ball member about the neck thereof, the direction of such movement being at a sharp angle laterally with respect to the direction of insertion and withdrawal of said ball member whereby said movable wall and mounting means are adapted, in the said position of said wall, to resist the thrust of the ball head in the direction of retraction thereof from said socket member.

8. A trailer hitch comprising the combination with a ball member having a head and a reduced neck, of an attaching member having a ball receiving socket, an opening leading thereto and an extension of the socket wall constricting said opening about the neck of said ball member, a bore in the attaching member leading to the opening, and a detent movable in said bore to and from a position such that said detent constricts said opening about said neck to divide with said wall extension the outward thrust of the ball head in the socket, the direction of said bore being such that the outward thrust of the said ball head on said detent is exerted in a direction other than the direction of retraction of said detent in said bore from said position, together with spring means biasing said detent toward said position, the direction of retraction of said detent in said bore being such that said detent will yield against said spring means under the thrust of the ball head when the latter is moving through the opening toward the interior of the socket.

MAX E. DAYTON.